UNITED STATES PATENT OFFICE

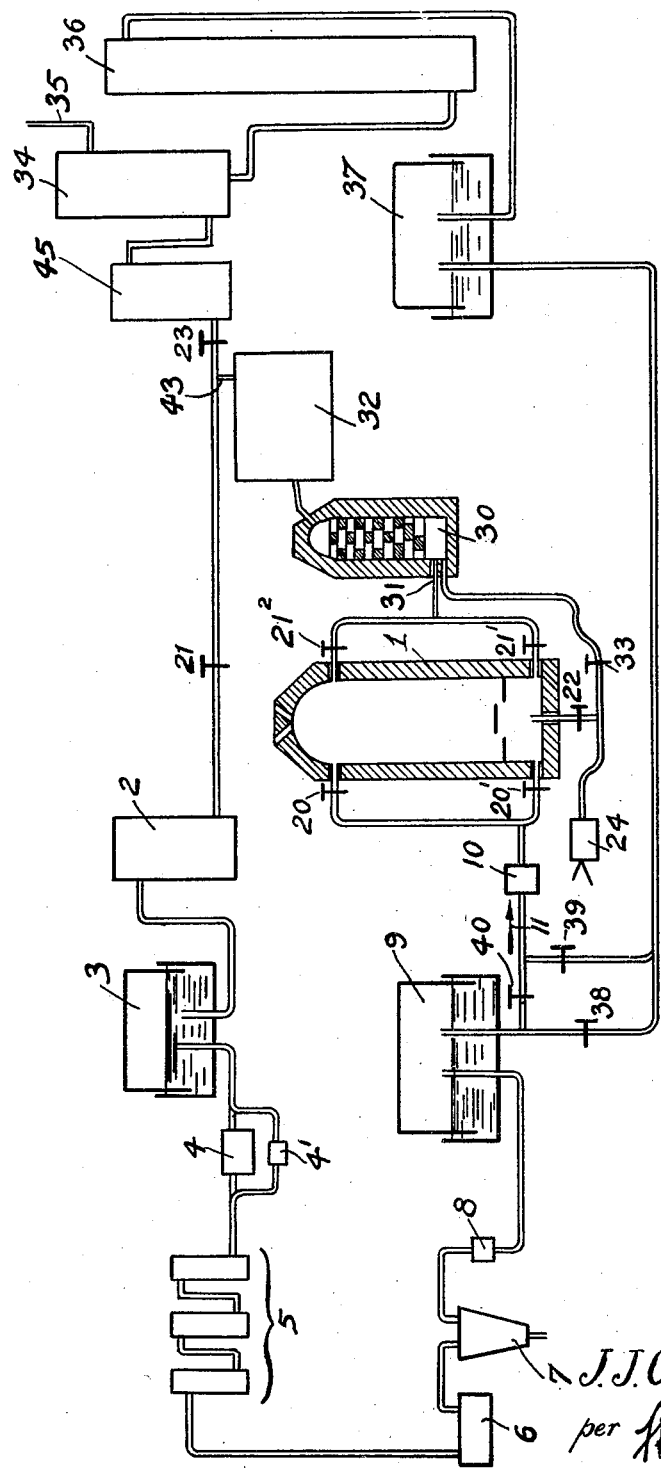

JACOBUS JOANNES CORNELIUS WILLEKENS, OF BRUSSELS, BELGIUM, ASSIGNOR TO THE GENERAL CARBONALPHA COMPANY, OF WILMINGTON, DELAWARE, A CORPORATION OF DELAWARE

PROCESS FOR THE MANUFACTURE OF CARBON BY DISSOCIATION OF CARBON MONOXIDE STARTING FROM A COMBUSTIBLE TREATED IN A GAS PRODUCER

Application filed March 26, 1931, Serial No. 525,410, and in France April 1, 1930.

The present invention has for its object the improvement of known processes for the manufacture of carbon by the dissociation of carbon monoxide, starting from a combustible treated in a gas producer. In these processes a gas producer is for example used to make a gas rich in carbon monoxide, which is catalyzed, the carbon monoxide being decomposed into carbon and carbonic acid according to the reaction $2CO = CO^2 + C$, while the carbonic acid thus formed is brought back to the gas producer through the layer of combustible (coke for example) at a high temperature, to be there transformed into carbon monoxide, which serves again for the catalytic reaction; thus a closed circuit is produced. The reaction $C + CO^2 = 2CO$ being endothermic, the gas producer cools; it is therefore necessary to heat it; to this end the operation of reducing the carbonic acid gas, $CO^2$ in the producer is stopped and air is blown into the producer; this is the blowing period as opposed to the preceding reducing period.

According to the reaction $CO^2 + C = 2CO$ in the producer and $2CO = C + CO^2$ in the catalyzer, there should be no need of any other gas than that which circulates in the closed circuit.

It is in practice impossible to completely avoid losses arising from leakages, from chemical washing, from the collection of the carbon and from the clearances necessary to avoid the accumulation in the circuit of useless gases such as nitrogen; it is therefore necessary to make up this deficiency.

The present invention has for its object to supply the balance of $CO^2$ to make up this deficiency.

The invention refers in particular to a process for the catalytic preparation of carbon, characterized by the combination with the reaction circuit of a recuperation and carbonic acid manufacturing circuit, utilizing the air gas made during the blowing periods.

According to one form of carrying out this process, the richness of the carbonic acid gas contained in the air gas made during the period of blowing is augmented, then the whole of this carbonic acid gas is recuperated and it is introduced as a make-up into the principal gas circuit before the producer.

According to a particular form of this improved process, the air gas is burnt in order to transform the carbon monoxide CO into carbonic acid gas $CO^2$.

The gases arising from this combustion pass for example into a basic solution such as ammonia, which retains the carbonic acid in the form of a carbonated solution (carbonate or bicarbonate), the other gases being thus separated. The carbonated solution obtained is decomposed to regenerate the carbonic acid on the one hand and the basic product on the other.

The calories necessary for the decomposition of this carbonated solution are with advantage taken from the heat of the gases from the producer or from the combustion of the air gas, by recuperation.

Naturally the means user to recuperate the carbonic acid may be modified; in particular the gas from the combustion of the carbon monoxide may be compressed and the $CO^2$ be dissolved in water to separate it.

In one variation of the general process according to the invention, each period (reduction and blowing) is followed by an intermediate period, in which the carbonic acid gas recuperated as above mentioned, is introduced into the producer in order to neutralize, purify and drive towards the recuperation circuit, the unsuitable gases from this producer.

Instead of neutralizing and purifying by the admission of the carbonic acid gas into the producer, the same result may be attained by the admission of steam into this producer; the gases arising from this operation may be directed into the recuperation circuit.

The invention extends in a general way to the characteristics of the above improved process whatever may be the particular method of carrying out the process for the manufacture of the carbon by dissociation of the carbon monoxide starting from a combustible treated in a producer. The invention also extends to these general characteristics whatever may be the installation selected for the carrying out of the improved process. Nevertheless one of these installations is shown diagrammatically as an example in the only figure of the annexed drawing, so as to give a very clear explanation of one form of carrying out the process.

This installation comprises a reaction circuit from 2 to 10.

This circuit comprises a gas producer 1, a dust remover 2, a gas holder 3, a compressor 4 with a by-pass regulator 4', washers 5, a catalyzing apparatus 6, a separator 7, a pressure reducing valve 8, a gas holder 9, a fan 10. The arrow 11 indicates the direction of circulation of the gases.

The reaction circuit passes through the producer by the open valves 20 and 21, either in the direction $20^1$ 20 or in the direction 20 $20^1$.

The air blowing involves a fan 24, and a valve 22, the gas and air mixture resulting from blowing air through the incandescent coke in the producer escaping through the valve $21^2$, the valves $20^1$, 20 and $21^1$ being closed during the blowing period.

The compressor may remain continuously at work, for the gas stored in the holder 3 ensures continuity during the period of blowing in the producer.

An installation of this kind comprises therefore a certain volume of gas $CO^2$, CO and others, which circulates in a closed circuit passing successively into the producer 1, where it takes up carbon while carrying away impurities, and into the catalyzer 6 where it gives up the carbon; there may however be a certain proportion of CO remaining not dissociated after the catalysis.

In accordance with the invention a recuperation and carbonic acid gas manufacturing circuit is combined in the following manner with the reaction circuit above described.

The gas on leaving the producer passes into a furnace 30 through a burner 31 which can receive air from the fan 24, a valve 33 permitting the control of this air.

On leaving the furnace 30 the gas passes through a recuperation boiler 32 which serves to provide all or a part of the force for the installation: pumps, compressor etc., and also to ensure the heating of the various apparatus.

The gas leaves at 43 and may be directed by manipulating the valves 21 and 23 into the reaction circuit or into the recuperation circuit.

During the period of reduction (the valves 20—$20^1$—21 being suitably open, the valves 22—23—33 being closed), the gas passes through the furnace 30 without burning, since the valve 33 is closed; it gives up its calories at 32 and passes into the reaction circuit 2—3—4—5-6.

During the blowing period (the valves $20^1$, 20, $21^1$ being closed, the valves 22—$21^2$—23—33 being open), the air gas produced burns in the burner 31 due to the air supplied by the valve 33 which is open.

The CO contained in the air gas is thus transformed into carbonic acid gas $CO^2$. The gas then passes into a dust remover 45 and then into a washer 34 containing a basic solution, ammonical liquor for example; the carbonic acid gas $CO^2$ is thus transformed into a carbonate or bicarbonate and the other gases, in particular the nitrogen, are discharged by a chimney 35.

The carbonated solution which is formed is stable at low temperatures. If it is heated by means of steam issuing from the recuperation boilers of a distilling apparatus 36, the carbonic acid gas in the solution will be liberated.

The carbonic acid gas thus produced is stored in the gas holder 37 in order to compensate for any losses of such gas in the reaction circuit or other systems. The regenerated basic solution serves anew for the washing of the carbon dioxide.

The $CO^2$ produced in the furnace 30 may also be recuperated by washing under pressure, and then be delivered into the gas holder 37.

The gas holder 37 may be placed in communication with the gas holder 3. The valve 38 controlling this communication may be manipulated automatically by the cover of the gas holder 9, the valve 38 opening in the case of an insufficiency of gas in the holder 9.

The carbonic acid gas coming from the gas holder 37 may also be used to neutralize and purify the producer 1 between the reduction and the blowing periods; to this end, the valve 39 is opened, after the valve 40 communicating with the gas holder has been closed. The gaseous neutralizing current passes through the fan 10, the valves 20, $20^1$ and 21, to enter the recuperation circuit 30, 32.

There is thus constituted between each period (reduction and blowing), an intermediate period during which the gases from the producer are forced towards the recuperation circuit, these gases being again used in this circuit for the manufacture of the carbonic acid gas. This operation of neutralization thus permits the avoidance of any risk of explosion due to the rapid combustion of the carbon monoxide remaining from the catalysis when passing from the period of reduction to the period of blowing and vice versa.

It is also possible to neutralize and purify by the introduction of steam below the grate of the producer 1. This steam being produced for example by the recuperation boiler 32 of the installation.

In recapitulation, there is obtained according to the invention, a process permitting in particular the use in a simple manner of the gases coming from the blowing period and applying them to compensate for the losses of the closed catalytic reaction circuit, using the ordinary working of a gas producer of discontinuous operation.

I claim:

1. Process for the manufacture of carbon by the dissociation of carbon monoxide which, in a combined group of steps consists in making, in a period of reduction, gases rich in carbon monoxide in a gas producer, causing these gases to pass over a catalyzer which decomposes the carbon monoxide with the deposit of carbon and the formation of carbonic acid gas, heating in a blowing period a charge of combustible in the gas producer by blowing air and producing combustion of this combustible, causing the gases impoverished in carbon monoxide and coming from the catalysis, to pass into the charge of combustible thus heated up in order to commence a fresh period of reduction, recuperating, on the other hand, the carbonic acid and gas mixture contained in the air gas made during the blowing period, and introducing this carbonic acid gas as a compensator into the principal gaseous circuit before the gas producer.

2. Process for the manufacture of carbon by the dissociation of carbon monoxide which, in a combined group of steps, consists in making, in a period of reduction, gases rich in carbon monoxide in a gas producer, causing these gases to pass over a catalyzer which decomposes the carbon monoxide with the deposit of carbon and the formation of carbonic acid gas, heating in a blowing period a charge of combustible in the gas producer by blowing air and producing combustion of this combustible, causing the gases impoverished in carbon monoxide and coming from the catalyzer to pass into the charge of combustible thus heated up in order to commence a fresh period of reduction, increasing the amount of the carbonic acid and gas mixture contained in the air gas made during the period of blowing, recuperating all this carbonic acid gas, and in introducing it as a compensator into the principal gaseous circuit before the gas producer.

3. Process for the manufacture of carbon by the dissocation of carbon monoxide which, in a combined group of steps, consists in making, in a period of reduction, gases rich in carbon monoxide in a gas producer, causing these gases to pass over a catalyzer which decomposes the cabron monoxide with the deposit of carbon and the formation of carbonic acid gas, heating during a period of blowing a charge of combustible in the gas producer by blowing air and producing combustion of this combustible, causing the gases impoverished in carbon monoxide and coming from the catalysis to pass into the charge of combustible thus heated up, to commence a fresh period of reduction, burning the air gas made during the blowing period in such manner as to transform its carbon monoxide into carbonic acid, recuperating all this carbonic acid gas and in introducing it as a compensator into the principal gaseous circuit before the gas producer.

4. Process for the manufacture of carbon by the dissociation of carbon monoxide which, in a combined group of steps, consists in making, in a period of reduction, gases rich in carbon monoxide in a gas producer, in causing these gases to pass over a catalyzer which decomposes the carbon monoxide with the deposit of carbon and the formation of carbonic acid gas, heating during a period of blowing, a charge of combustible in the gas producer by blowing air and producing combustion of this combustible, causing the gases impoverished in carbon monoxide and coming from the catalysis to pass into the charge of combustible thus heated up in order to commence a fresh period of reduction, causing the air and gas mixture made during the blowing period to pass through a basic solution which retains the carbonic acid in the state of a carbonated solution, the other gases being thus separated, decomposing this carbonated solution to regenerate the carbonic acid gas on the one hand, and the basic solution on the other hand, and introducing this carbonic acid gas as a compensator into the principal gaseous circuit before the gas producer.

5. Process for the manufacture of carbon by the dissociation of carbon monoxide which, in a combined group of steps, consists in making, in a period of reduction, gases rich in carbon monoxide in a gas producer, causing these gases to pass over a catalyzer which decomposes the carbon monoxide with the deposit of carbon and the formation of carbonic acid gas, heating in a period of blowing, the charge of combustible in the gas producer by blowing air and producing combustion of this combustible, causing the gases impoverished in carbon monoxide and coming from the catalysis to pass into the charge of combustible thus heated up in order to commence a fresh period of reduction, causing the air gas made during the blowing period to pass through a basic solution which retains the carbonic acid in the state of a carbonated solution, the other gases being thus separated, decomposing the carbonated solution by heating it by the heat accumulated therein in the preceding operation and thereby providing for regeneration of the carbonic acid gas on the one hand, and of the basic solution on the other hand, and introducing this carbonic acid gas as a compensator into the principal gaseous current, before the gas producer.

6. Process for the manufacture of carbon by the dissociation of carbon monoxide which, in a combined group of steps, consists in making, in a period of reduction, gases rich in carbon monoxide, in a gas producer, causing these gases to pass over a catalyzer which decomposes the carbon monoxide with the deposit of carbon and the formation of carbonic acid gas, heating in a period of blowing, a charge of combustible in the gas producer by blowing air and producing combustion of this combustible, causing the gases impoverished in carbon monoxide and coming from the catalysis to pass into the charge of combustible thus heated, in order to commence a fresh period of reduction, in burning the air and gas mixture made during the period of blowing in such manner as to transform its carbon monoxide content into carbonic acid gas, causing this air and gas mixture to pass into a basic solution which retains the carbonic acid in the state of a carbonated solution, the other gases being thus separated, decomposing this carbonated solution by heating it by means of the heat accumulated therein and arising from the combustion of said air and gas mixture, and thereby provide for the regeneration of the carbonic acid gas on the one hand, and the basic solution on the other hand, and introducing this carbonic acid gas as a compensator into the principal gaseous current before the gas producer.

7. Process for the manufacture of carbon by the dissociation of carbon monoxide which, in a combined group of steps, consists in making, in a period of reduction, gases rich in carbon monoxide in a gas producer, causing these gases to pass over a catalyzer which decomposes the carbon monoxide with the deposit of carbon and the formation of carbonic acid gas, heating in a period of blowing, a charge of combustible in the gas producer by blowing air and producing combustion of this combustible, causing the gases impoverished in carbon monoxide and coming from the catalysis to pass into the charge of combustible thus heated up, in order to commence a fresh period of reduction, causing the air and gas mixture made during the period of blowing to pass under pressure into water so as to dissolve its carbonic acid gas, recovering the said gas and introducing the same as a compensator into the principal gaseous circuit before the gas producer.

8. Process for the manufacture of carbon by the dissociation of carbon monoxide which, in a combined group of steps, consists in making, in a period of reduction, gases rich in carbon monoxide, in a gas producer, causing these gases to pass over a catalyzer which decomposes the carbon monoxide with the deposit of carbon and the formation of carbonic acid gas, heating in a period of blowing, a charge of combustible in the gas producer by blowing air and producing combustion of this combustible, recuperating on the other hand the carbonic acid gas contained in the air and gas mixture made during the period of blowing, introducing this carbonic acid gas as a compensator into the principal gaseous current before the gas producer, causing the passage in an intermediate period of a current of carbonic acid gas through the mass of combustible to drive from it the undesirable gases, and causing the gases impoverished in carbon monoxide and coming from the catalysis to pass into the charge of combustible thus heated and purified, in order to commence a fresh period of reduction.

9. Process for the manufacture of carbon by the dissociation of carbon monoxide which, in a combined group of steps, consists in making, in a period of reduction, gases rich in carbon monoxide in a gas producer, causing these gases to pass over a catalyzer which decomposes the carbon monoxide with the deposit of carbon and the formation of carbonic acid gas, heating in a period of blowing the charge of combustible in the gas producer by blowing air and producing combustion of this combustible, recuperating on the other hand the carbonic acid gas contained in the air and gas mixture made during the blowing period, introducing this carbonic acid gas as a compensator, into the principal gaseous current before the gas producer, in causing the passage in an intermediate period of a current of steam through a mass of combustible to drive from it the undesirable gases, and causing the gases impoverished in carbon monoxide and coming from the catalysis to pass into the charge of combustible thus heated and purified in order to commence a fresh period of reduction.

10. Process for the manufacture of carbon by the dissociation of carbon monoxide which, in a combined group of steps, consists in making, in a period of reduction, gases rich in carbon monoxide, in a gas producer, in causing these gases to pass over a catalyzer which decomposes the carbon monoxide with the deposit of carbon and the formation of carbonic acid gas, heating in a period of blowing a charge of combustible in the gas producer by blowing air and producing combustion of this combustible, recuperating on the other hand the carbonic acid gas contained in the air and gas mixture made during the blowing period and in introducing this carbonic acid gas as a compensator into the principal gaseous circuit before the gas producer, causing the passage, in an intermediate period of a current of steam through the combustible mass to drive from it the undesirable gases, causing the gases impoverished in carbon monoxide and coming from the catalysis to pass into the charge of combustible thus heated and purified, in order to commence a fresh period of reduction, recuperating the water gas arising from the passage of the steam during the intermediate period and transforming it partly into carbonic acid gas and in again introducing this carbonic acid gas as a compensator into the principal gaseous circuit before the gas producer.

In testimony whereof I have signed this specification.

JACOBUS JOANNES CORNELIUS WILLEKENS.